United States Patent
Wright et al.

(10) Patent No.: US 7,877,216 B2
(45) Date of Patent: Jan. 25, 2011

(54) METHOD, SYSTEM, AND APPARATUS FOR FRICTION PAD WEAR AND BRAKE CONDITION MONITORING

(75) Inventors: Mark A Wright, Albuquerque, NM (US); George L Wright, Corrales, NM (US)

(73) Assignee: Honeywell International Inc., Morristown, NJ (US)

( * ) Notice: Subject to any disclaimer, the term of this patent is extended or adjusted under 35 U.S.C. 154(b) by 34 days.

(21) Appl. No.: 12/182,480

(22) Filed: Jul. 30, 2008

(65) Prior Publication Data

US 2010/0030490 A1    Feb. 4, 2010

(51) Int. Cl.
*G01N 3/56* (2006.01)
*F16D 66/02* (2006.01)
*G06F 19/00* (2006.01)

(52) U.S. Cl. .............................. 702/34; 702/33; 702/35; 702/36; 73/7; 701/33; 188/1.11 E; 188/1.11 L; 340/454; 340/479

(58) Field of Classification Search ............. 702/33–36; 701/33; 188/1.11 E, 1.11 L; 340/454, 479
See application file for complete search history.

(56) References Cited

U.S. PATENT DOCUMENTS

| | | |
|---|---|---|
| 4,790,606 A | 12/1988 | Reinecke |
| 5,668,529 A | 9/1997 | Kyrtsos |
| 6,302,241 B1 | 10/2001 | Gronowicz, Jr. |
| 6,341,670 B1 | 1/2002 | Leblanc et al. |
| 6,366,201 B1 | 4/2002 | Hanisko |
| 6,384,721 B1 | 5/2002 | Paielli |
| 6,411,206 B1 | 6/2002 | Weant et al. |
| 6,696,937 B1 * | 2/2004 | Kiefer .......................... 340/453 |
| 6,958,565 B1 | 10/2005 | Liu |

(Continued)

FOREIGN PATENT DOCUMENTS

DE    42 42 084 A1    6/1994

(Continued)

OTHER PUBLICATIONS

Brian J. Murphy et al., Diagnostic End to End Monitoring & Fault Detection for Braking Systems, 2006 Institute of Electrical and Electronics Engineers (IEEE), Aerospace Conference, Mar. 4-11, 2006, pp. 1-8, IEEE.

(Continued)

*Primary Examiner*—Sujoy K Kundu
(74) *Attorney, Agent, or Firm*—Ingrassia Fisher & Lorenz, P.C.

(57) ABSTRACT

A brake, system, and method are presented. The brake includes friction material, a backing pad, sensor-wear material embedded within the friction material, and an electronics assembly. The electronics assembly is configured to measure a characteristic of the sensor-wear material, such as the electrical resistance or the temperature of the sensor-wear material. The sensor-wear material may be applied to the brake using a variety of approaches. A condition of the brake, such as a brake-wear value or an estimated-mileage value is determined, based on the measured characteristic of the sensor-wear material. A brake-wear state may be determined by comparing the brake-wear value to one or more thresholds. The brake-wear value, estimated-mileage value, and/or the brake wear state may be indicated on a brake-wear indicator.

20 Claims, 9 Drawing Sheets

U.S. PATENT DOCUMENTS

| | | | |
|---|---|---|---|
| 7,014,016 B2 * | 3/2006 | Morris et al. | 188/1.11 W |
| 7,086,503 B2 | 8/2006 | Miller et al. | |
| 7,108,107 B2 | 9/2006 | Ralea et al. | |
| 7,114,596 B2 | 10/2006 | Borugian | |
| 7,152,935 B2 | 12/2006 | Kinder et al. | |
| 7,175,006 B2 | 2/2007 | Plantan et al. | |
| 7,232,013 B2 * | 6/2007 | Thrush | 188/1.11 L |
| 7,244,003 B2 * | 7/2007 | Larson | 303/191 |
| 7,248,154 B2 | 7/2007 | Menke | |
| 7,267,204 B2 | 9/2007 | Honda et al. | |
| 7,370,733 B2 * | 5/2008 | Nechvatal | 188/1.11 W |
| 2007/0038346 A1 | 2/2007 | Ehrlich et al. | |
| 2007/0052289 A1 | 3/2007 | Nilsson et al. | |

FOREIGN PATENT DOCUMENTS

| | | |
|---|---|---|
| DE | 20 2007 017 613 U1 | 6/2008 |
| EP | 1 308 321 A1 | 5/2003 |

OTHER PUBLICATIONS

U.S. Appl. No. 12/022,859, filed Jan. 30, 2008, Wright et al.
U.S. Appl. No. 11/955,198, filed Dec. 12, 2007, Wright et al.
European Search Report from corresponding EP Application No. 09166396.3, mailed Nov. 12, 2009, 3 pages.

* cited by examiner

METHOD, SYSTEM, AND APPARATUS FOR FRICTION PAD WEAR AND BRAKE CONDITION MONITORING

BACKGROUND OF THE INVENTION

1. Field of the Invention

This invention relates to the field of brakes. Most particularly, this invention relates to a system, method and apparatus for measuring a condition of a brake using sensor-wear material embedded in the brake.

2. Background

Brakes often control the motion of vehicles, particular motor vehicles, such as cars, buses, SUVs, minivans, vans, trucks, and military vehicles. A driver typically applies a brake, such as a brake of a vehicle, by pressing on a brake pedal or pulling a brake lever. When applied, the brake slows down or stops the vehicle by use of friction on a rotating surface.

Motor vehicles generally use one or both of two types of brakes: disc brakes and drum brakes. FIG. 1A shows a typical disc and rotor brake assembly 100 for use with a motor vehicle. The typical disc and rotor brake assembly 100 has a rotor 110 and two disc-brake pads 120 and 130. The disc-brake pad 120 is made up of friction material 122 mounted on a backing pad 124. The disc-brake pad 130 is typically a symmetric counterpart to disc-brake pad 120, also made up of friction material 132 mounted on a backing pad 134. Disc and rotor brake assemblies are often used in automobiles.

Typically, when the brake is applied, (i.e., a driver presses on a brake pedal), a fluid is forced through a series of tubes and hoses to a brake assembly at each wheel of the vehicle. The fluid typically is either air or "brake fluid". Air is used as the fluid for air brakes, which commonly control the motion of rail cars and heavy trucks. A typical brake fluid is hydraulic oil, which is often used with automobile brakes. In the case of a disc and rotor brake assembly, the action of the fluid causes disc-brake pads 120 and 130 to move toward and then contact the rotor 110. The friction material 122 and 132 on each respective disc-brake pad 120 and 130 contacts the rotor 110 to slow or stop the vehicle via friction.

FIG. 1B shows a cross-sectional view of a typical drum brake assembly 150, consisting of a drum-brake shoe 160 with friction material 162 mounted on a backing pad 164. The drum-brake shoe 160 is mounted inside a drum 170 that rotates with a wheel of the vehicle. When the brake is applied, the action of the fluid pushes the drum-brake shoe 160 toward the surface of the drum 170, and the friction material 162 contacts the drum 170 to slow or stop the vehicle via friction. Drum brake assemblies are often used with air brakes and as automotive emergency brakes.

As brakes typically use friction to slow or stop a vehicle, they are subject to wear. Typically, visual inspection of the brakes determines an amount of "brake wear" or the wear of the friction material of the brake. As brake wear increases, a typical brake may provide audible indicators of wear, such as squeaking or "chirping" sounds. If a brake becomes overheated, due to excessive use or other reasons, the brake may "glaze" when the friction material heats enough to liquefy. When cooled, the formerly liquefied friction material may form a coat or glaze over the brake that reduces the effectiveness of the glazed brake.

SUMMARY

A first principal embodiment of the invention provides a brake. The brake includes friction material, a backing pad, sensor-wear material embedded within the friction material, and an electronics assembly. The electronics assembly is configured to measure a characteristic of the sensor-wear material.

A second principal embodiment of the invention provides a system. The system includes a first brake and a brake-wear calculator. The first brake, configured for use in a vehicle, includes friction material, a backing pad, sensor-wear material embedded within the friction material, and an electronics assembly. The brake-wear calculator includes a processing unit, a brake-wear indicator, data storage, and machine-language instructions stored in the data storage and executable by the processing unit to perform functions. The functions include receiving a first measurement of a condition of the first brake and displaying an indication of the condition of the first brake on the brake-wear indicator. The indication of the condition of the first brake is based on the first measurement.

A third principal embodiment of the invention provides a method for indicating a condition of a brake. The brake wear of a brake is determined using sensor-wear material on a brake component. The condition of the brake is determined based on the brake wear. The condition of the brake is indicated.

BRIEF DESCRIPTION OF THE DRAWINGS

Various examples of embodiments are described herein with reference to the following drawings, wherein like numerals denote like entities, in which.

DETAILED DESCRIPTION

The invention includes embedding sensor-wear material within a brake to provide an indication of brake wear. The sensor-wear material may change one or more characteristics as brake wear increases. For example, the sensor-wear material may change its electrical resistance as brake wear increases.

The sensor-wear material may be embedded in a variety of different methods within the brake. The sensor-wear material may be embedded at a single point drilled through friction material of a brake, as a surface coating over part or all of the friction material of the brake, as layers throughout the friction material or may be embedded using a combination of these techniques.

An electronic assembly may connect to the sensor-wear material. The electronic assembly may measure one or more characteristics of the sensor-wear material, and thus permit determination the brake wear of the brake. For example, the electronic assembly may measure the resistance of the sensor-wear material and/or the temperature of the sensor-wear material. As the sensor-wear material wears down along with the friction material of the brake, the measured characteristic(s) of the sensor-wear material may change (i.e., diminish). The measured characteristic(s) may determine the amount of brake wear, perhaps by comparing the measured characteristic(s) to one or more brake-wear thresholds. The determination of the brake wear may be performed by the electronic assembly and/or by a brake-wear calculator that receives the measurement of the sensor-wear material and then determines the brake wear. As more than one brake may be mounted on the vehicle, the measurement of the sensor-wear material may also include an indication of a location of the brake being measured.

The determined brake wear may be displayed. For example, a view of a percentage of brake wear may be provided. A graphical "stop-light display" of brake wear may be provided as well. The stop-light display may provide a graphical indication of one or more states of brake wear, including but not limited to a normal state, a degraded state and a critical state of brake wear. An estimate of the number of miles to change the brakes may be provided based on the determined brake wear. Also, an indication of a state of a particular brake of the vehicle may be provided (e.g., the front driver-side brake is 20% worn).

The brake-wear calculator may also include the functionality of a mechanical-system (MS)-health indicator. The MS-health indicator is described in detail in U.S. patent application Ser. No. 12/022,859 entitled "Apparatus, System, and Method for Onboard Degraded and Deadlined Mechanical System Alerting" filed on Jan. 30, 2008 ("the MS-alert Application"), the complete contents of which are incorporated herein by reference. In particular, if the vehicle is equipped with an oil-viscosity sensor as described in the MS-alert Application, an indication of the MS-health of the vehicle may be provided as well.

An Example Vehicle

Figure 2:
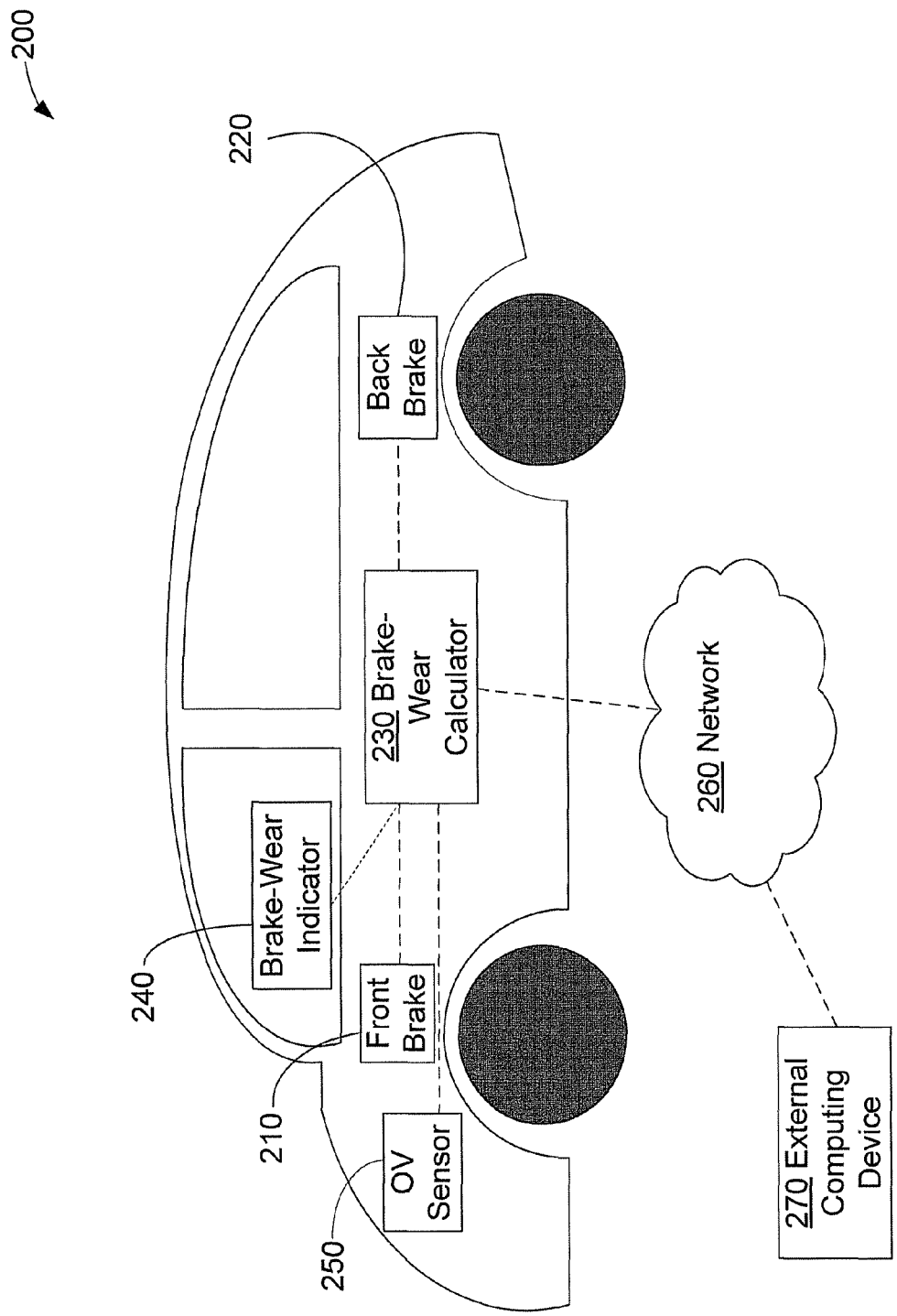
FIG. 2 shows a vehicle with front and back brakes, a brake-wear calculator, and a brake-wear indicator in accordance with embodiments of the invention.

Turning again to the figures, FIG. 2 shows a vehicle 200 with a front brake 210 and a back brake 220, a brake-wear calculator 230, and a brake-wear indicator 240, in accordance with embodiments of the invention.

The front brake 210 and/or the back brake 220 may be equipped with sensor-wear material, such as the brakes shown in FIGS. 3A, 3B, and 4 as discussed below. As such, the brake-wear calculator 230 may receive indication(s) of brake wear of the front brake 210 and/or the back brake 220. The brake-wear calculator 230 may display indications of brake wear from the front brake 210 and/or the back brake 220, based on the received indications of brake wear, on the brake-wear indicator 240.

A brake may have a location. For example, the front brake 210 is located toward the front of the vehicle 200 and the back brake 220 is located toward the back of the vehicle 200. The indication of brake wear may indicate a location of a brake, such as "Front Brake" for an indication of brake wear from the front brake 210 and/or a location of a brake pad or shoe, such as "Inner Pad" or "Front Shoe". Then, a device sending an indication of brake wear may have stored data indicating a location of the brake, such as a textual string (e.g., "Front Brake, Inner Pad") or a brake identifier, such as a serial number, bar code value, or RFID-encoded information. If a brake identifier is used to determine location, the brake-wear calculator may determine a location of a brake using a table or similar data structure that relates brake identifiers to brake locations. If a vehicle has more than two axles (e.g., a semi tractor or cargo trailer), the location may identify an axle number and/or a side of the brake. Example brake identifiers for a truck trailer with 4 axles may be "Axle 3 Driver-Side Front Shoe" or "Axle 2 Passenger-Side Back Shoe"

The location of a brake may be determined, alternatively or in addition, based on characteristics of the connection between the brake wear calculator 240 and the brake. For example, the brake-wear calculator 240 may connect to a brake at a defined position on the brake-wear calculator 240, such as connect to the front brake 210 at brake-connection point #1 and the back brake 220 at brake-connection point #2 of the brake-wear calculator. Continuing with the example, the brake-wear calculator may determine that any indications of brake wear received at brake-connection point #2 are from the back brake 220 and thus determine the location of the brake providing the indication of brake wear.

The vehicle 200 may be equipped with an oil-viscosity sensor 250. The brake-wear calculator 230 may comprise the functionality of an MS-alert apparatus described in the MS-alert Application. As such, the brake-wear calculator 230 may receive one or more indications of health of an engine of the vehicle 200 from the oil-viscosity sensor 250 and possibly other sensors attached to the engine of the vehicle 200 (not shown). The brake-wear calculator 230 may then determine an MS-health measurement value and/or an MS-health state. The brake-wear calculator 230 may display the MS-health measurement value and/or the MS-health state on the brake-wear indicator 240.

The brake-wear calculator 240 may store data about the vehicle 200. In particular, the brake-wear calculator 240 may store data about brake wear, such as each received indication of brake wear from each brake (i.e., front brake 210 and back brake 220) of the vehicle 200. The brake-wear calculator 240 may also store information about the MS-health of the vehicle, if the vehicle is equipped with the oil sensor 250. The brake-wear calculator 230 may send the stored data about the vehicle 200 to an external computing device 270, perhaps via a network 260. The stored data may be sent from the brake-wear calculator 230 to the external computing device 270 using a format of an MS-health record, which is described with respect to FIG. 6 below.

Example Brakes with Embedded Sensor Material

Figure 3A:
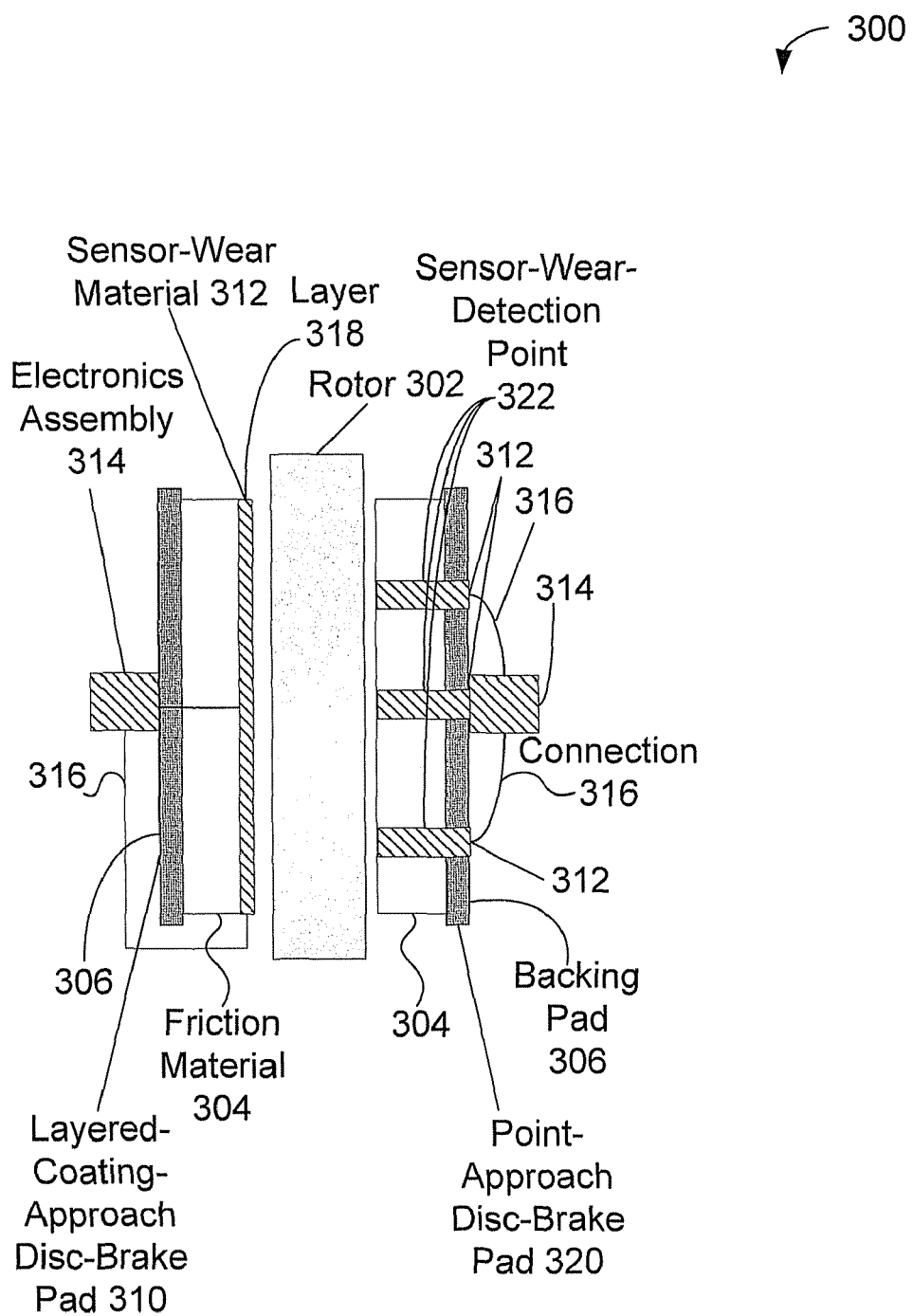
FIGS. 3A and 3B are cross-sectional views of example disc and rotor brake assemblies in accordance with embodiments of the invention.

FIG. 3A is a cross-sectional view of an example disc and rotor brake assembly 300 in accordance with embodiments of the invention. FIG. 3B is a cross-sectional view of an example disc and rotor brake assembly 350 in accordance with embodiments of the invention.

Figure 1A:
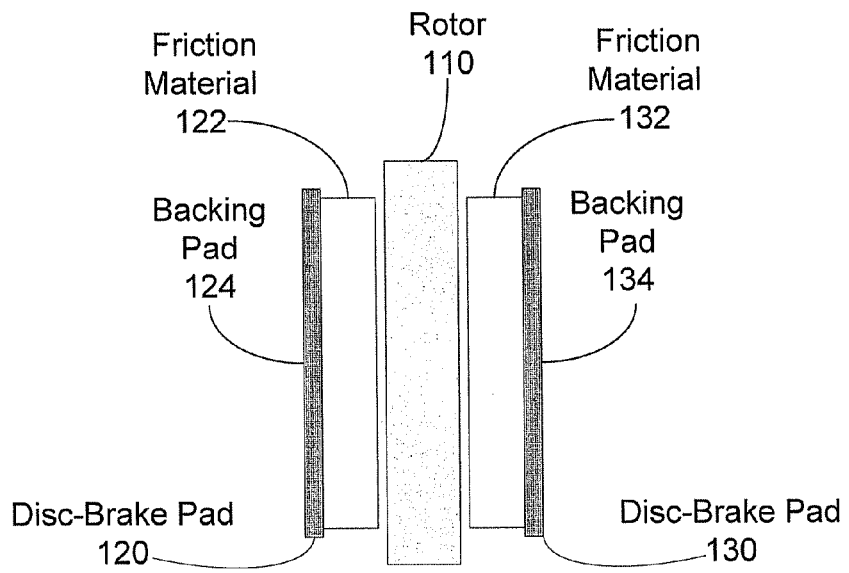
FIG. 1A shows a cross-sectional view of a typical disc and rotor brake assembly.
Figure 1B:
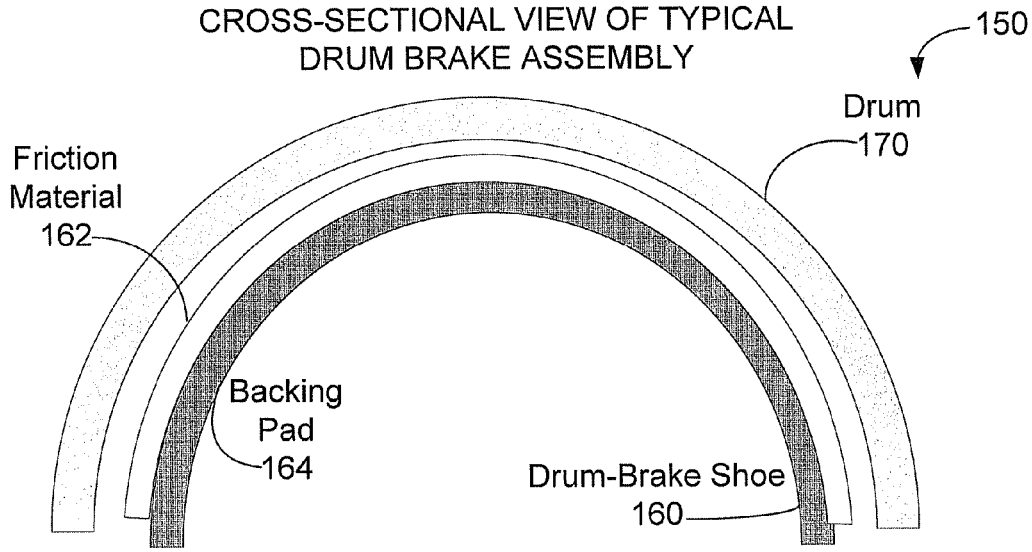
FIG. 1B shows a cross-sectional view of a typical drum brake assembly.

Disc and rotor brake assembly 300 comprises a rotor 302 with a layered-coating-approach disc-brake pad 310 and a point-approach disc-brake pad 320. The disc and rotor brake assembly 300 is configured to slow or stop a vehicle when the brakes are applied in the same fashion as disc and rotor brake assembly 100 and described above with respect to FIG. 1A.

Both layered-coating-approach disc-brake pad 310 and the point-approach disc-brake pad 320 have friction material 304 and a backing pad 306. Each disc-brake pad shown in FIG. 3A also has sensor-wear material 312 as well, which is applied in a sensor-wear layer 318 over a surface of friction material 340 for the layered-coating-approach disc-brake pad 310 or is applied at one or more sensor-wear-detection points 318 completely through the friction material 304 (and possibly through backing pad 306 as well) in point-approach disc-brake pad 320.

Figure 3B:
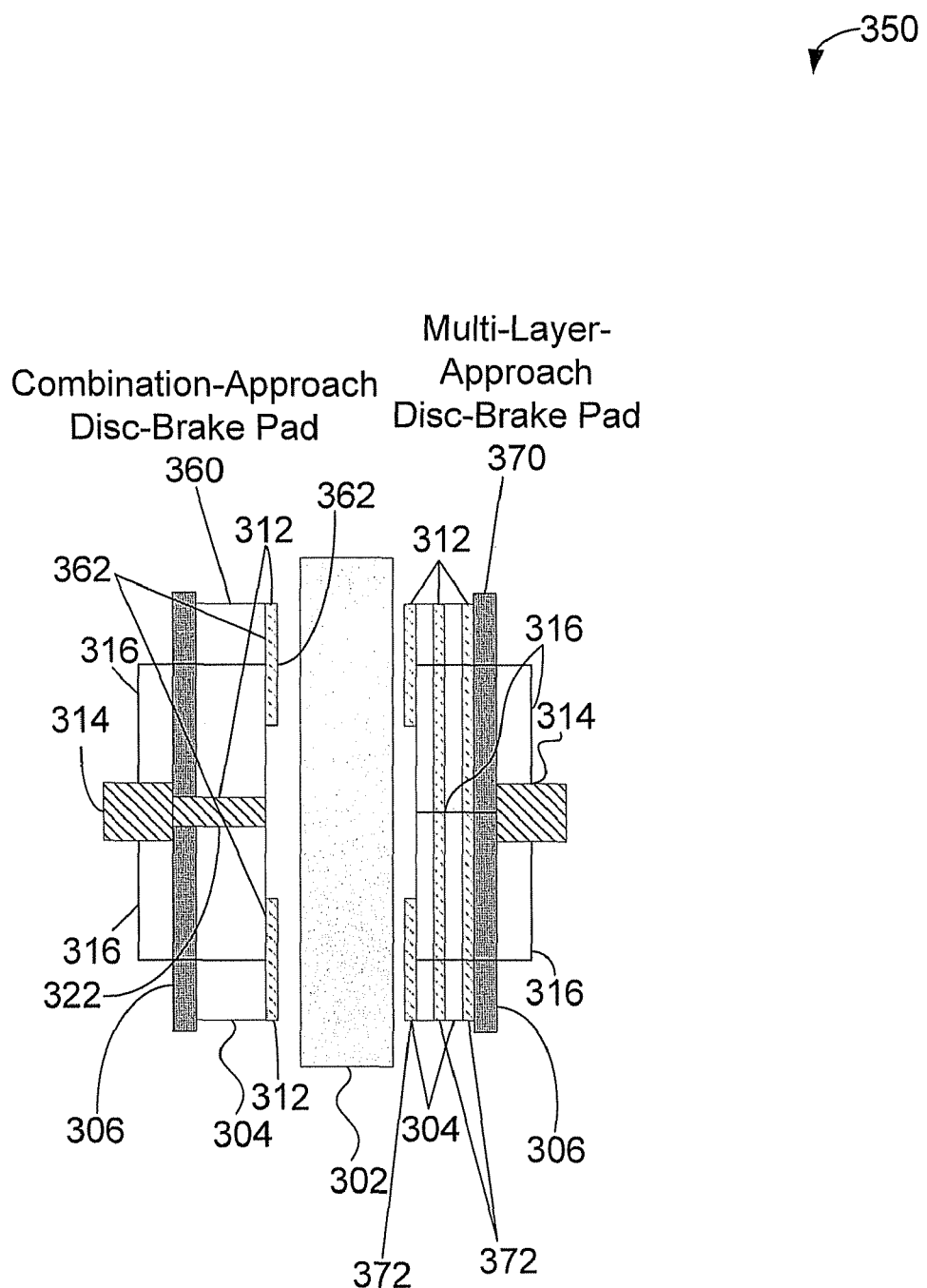

Similarly, as shown in FIG. 3B, both a combination-approach disc-brake pad 360 and the multi-layer-approach disc-brake pad 320 have friction material 304 and a backing pad 306. The combination-approach disc-brake pad 360 uses both a partial-sensor-wear layer 362 of sensor-wear material 312 applied to the surface of the friction material 304 and a point of sensor-wear material 322 applied completely through the friction material 304 and the backing pad 306. While a partial-sensor-wear layer 362 of sensor-wear material 312 is shown that covers part of the surface of the friction material 304 is shown applied with the combination-approach disc-brake pad 360, a complete sensor-wear layer (such as sensor-wear layer 322) of sensor-wear material 312 that completely covers the friction material 304 on the surface of layered-coating-approach disc-brake pad 310, may be used as well. Similarly, a partial layer, such as partial-sensor-wear layer 362, of sensor-wear material 312 may be used with the layered-coating-approach disc-brake pad 310. Also, while sensor-wear material 312 is shown applied at one sensor-wear-detection point 322 with combination-approach disc-brake pad 360, sensor-wear material 312 may be applied at more than one sensor-wear-detection point 322.

The multi-layer-approach disc-brake pad 370 may comprise two or more sensor-wear layers 372 of sensor-wear material 312 sandwiching layers of friction material 304. As shown in FIG. 3B, each sensor-wear layer 372 may be a complete layer or a partial layer of sensor-wear material 312. Further, other combinations of sensor-wear layers and sensor-wear-detection points are possible as well, such as use of multiple sensor-wear-detection points in combination with the multi-layer approach of multi-layer-approach disc-brake pad 370.

Both FIG. 3A and FIG. 3B show each disc-brake pad 310, 320, 360, and 370 with one or more connections 316 connecting the sensor-wear material 312 of the disc-brake pad 310, 320, 360, and 370 to an electronics assembly 314. The electronics assembly 314 may comprise some or all of the components of the computing device 500 described below with reference to FIG. 5. Each connection 316 may comprise wires, fiber-optic paths, and/or other connective materials.

The electronics assembly 314 may attach to the disc-brake pad 310, 320, 360, or 370, such as to the backing pad 306 of the respective disc-brake pad. While both FIGS. 3A and 3B show one electronics assembly 314 per disc-brake pad 310, 320, 360 and 370, a disc-brake pad may comprise more than one electronics assembly 314. Alternatively, one electronics assembly 314 may connect to two or more disc-brake pads. In particular, one electronics assembly 314 connected to all disc-brake pads may be used by a given vehicle or other machine utilizing brakes. Further, while both FIGS. 3A and 3B show disc-brake pads of different approaches on each side of the rotor 302 (e.g., a layered-coating-approach disc-brake pad 310 and a point-approach disc-brake pad 320 in FIG. 3A), a pair of disc-brake pads with the same type of approach may be used within a disc and rotor brake assembly as well.

The electronics assembly 314 may have one or more measurement devices to measure one or more characteristics of the sensor-wear material 312. For example, the electronics assembly 314 connected to the layered-coating-approach disc-brake pad 310 may comprise a resistance meter (ohm-meter) or other device to measure the electrical resistance to the sensor-wear material 312. Example characteristics of the sensor-wear material 312 that may be measured are voltage, current, capacitance, impedance, conductance, temperature, color, reflectivity, transmittance, length, thickness, and/or weight, as well as combinations of the herein-described characteristics. Other characteristics may be measured as well. For example, the electronics assembly 314 may comprise, instead of or in addition to a resistance meter, a temperature sensor for detecting changes in temperature.

Figure 4:
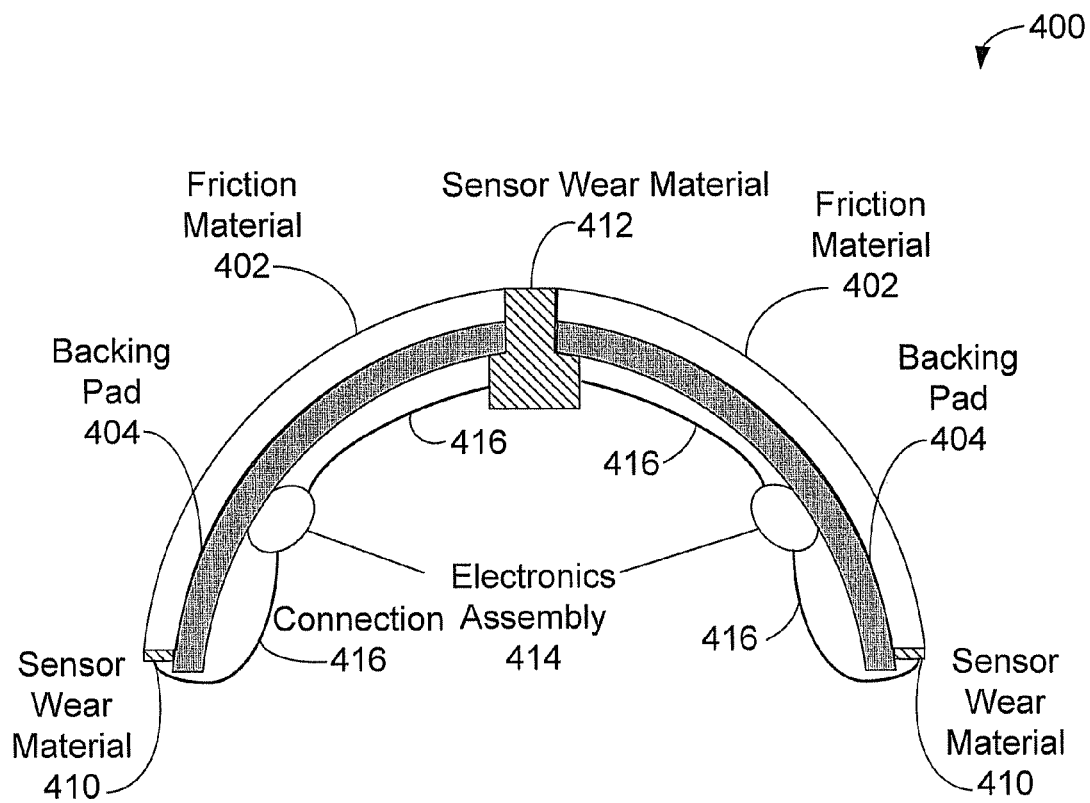
FIG. 4 is a cross-sectional view of a drum-brake shoe in accordance with embodiments of the invention.

FIG. 4 is a cross-sectional view of a drum-brake shoe 400, in accordance with embodiments of the invention. The drum-brake shoe 400 may be part of a drum brake that slows the motion of a vehicle or other mechanical device by coming in contact with a drum (not shown in FIG. 4) including friction material 402 and a backing pad 404.

FIG. 4 shows the drum-brake shoe 400 with sensor-wear material 412, two electronics assemblies 414, and connections 416. The sensor-wear material 412, each electronics assembly 414, and each connection 416 may be the same as or similar to the sensor-wear material 312, electronics assembly 314, and the connection 316, respectively, described above with reference to FIGS. 3A and 3B above, and as necessarily adapted for use within a drum-brake shoe 400.

FIG. 4 shows the sensor-wear material 412 is shown applied with a partial layer at each end of drum-brake shoe 412 and at a sensor-wear point approximately centered within the drum-brake shoe. As such, the sensor-wear material 412 on drum-brake shoe 400 is applied using a similar pattern to that used with the combination-approach disc-brake pad 360, described with reference to FIG. 3B above. The sensor-wear material 412 on the drum-brake shoe 400 also may be applied with patterns similar to the patterns of sensor-wear material used on layered-coating-approach disc-brake pad 310, the point-approach disc-brake pad 320, or the multi-layer approach disc-brake pad 370, described above with reference to FIGS. 3A and 3B, as well.

An Example Computing Device

Figure 5:
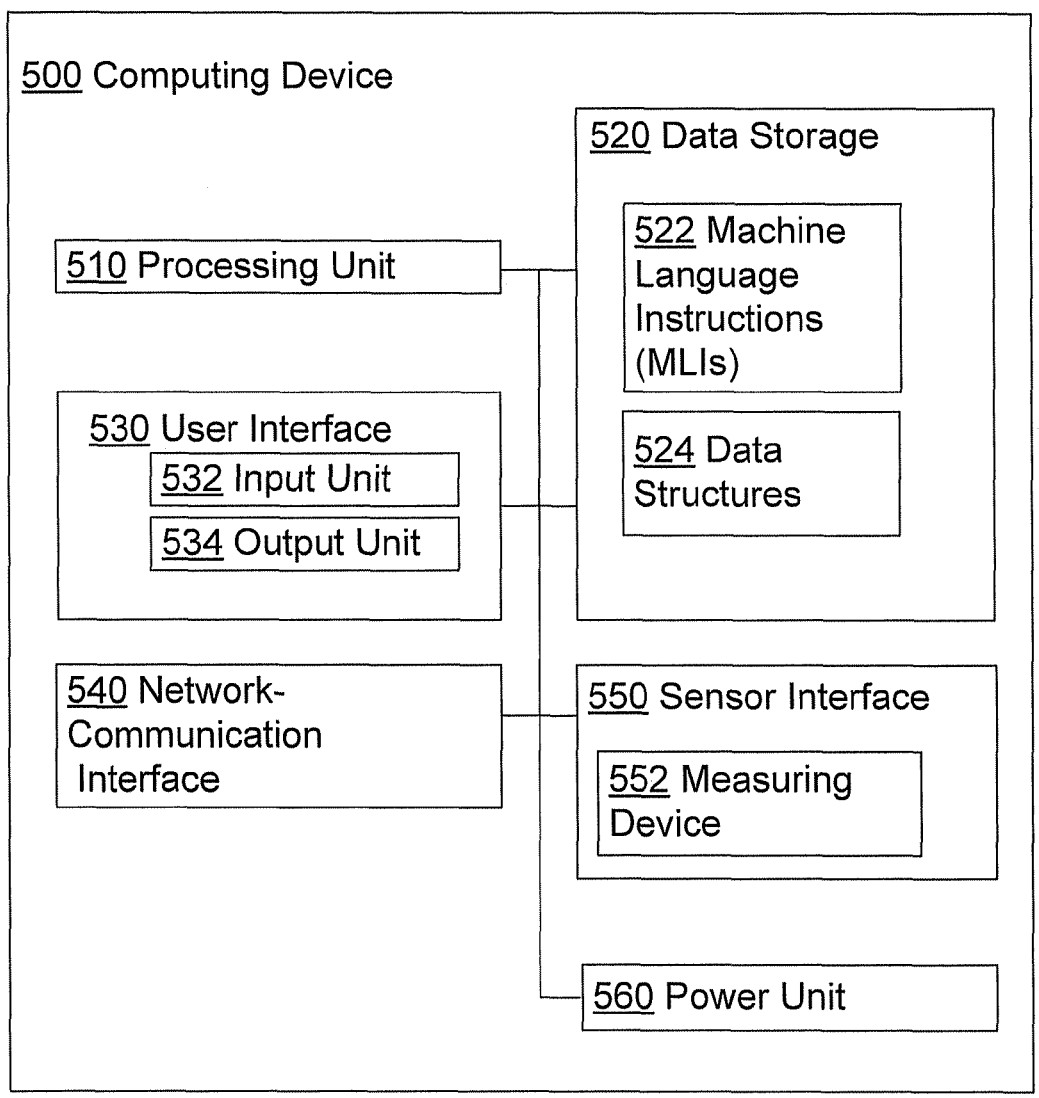
FIG. 5 is a block diagram of an example computing device in accordance with embodiments of the invention.

FIG. 5 is a block diagram of an example computing device 500, comprising a processing unit 510, data storage 520, a user interface 530, a network-communication interface 540, a sensor interface 550, and a power unit 560, in accordance with embodiments of the invention. A computing device 500 may be a desktop computer, laptop or notebook computer, personal data assistant (PDA), mobile phone, embedded processor, or any similar device that is equipped with a processing unit capable of executing machine-language instructions that implement at least part of the herein-described method 800 of FIG. 8, and/or herein-described functionality of a brake-wear calculator and/or a brake-wear indicator.

The processing unit 510 may include one or more central processing units, computer processors, mobile processors, digital signal processors (DSPs), microprocessors, computer chips, specialized logic circuitry, and similar processing units now known and later developed and may execute machine-language instructions and process data.

The data storage 520 may comprise one or more storage devices. The data storage 520 may include read-only memory (ROM), random access memory (RAM), removable-disc-drive memory, hard-disc memory, magnetic-tape memory, flash memory, and similar storage devices now known and later developed. The data storage 520 comprises at least enough storage capacity to contain machine-language instructions 522 and data structures 524.

Figure 8:
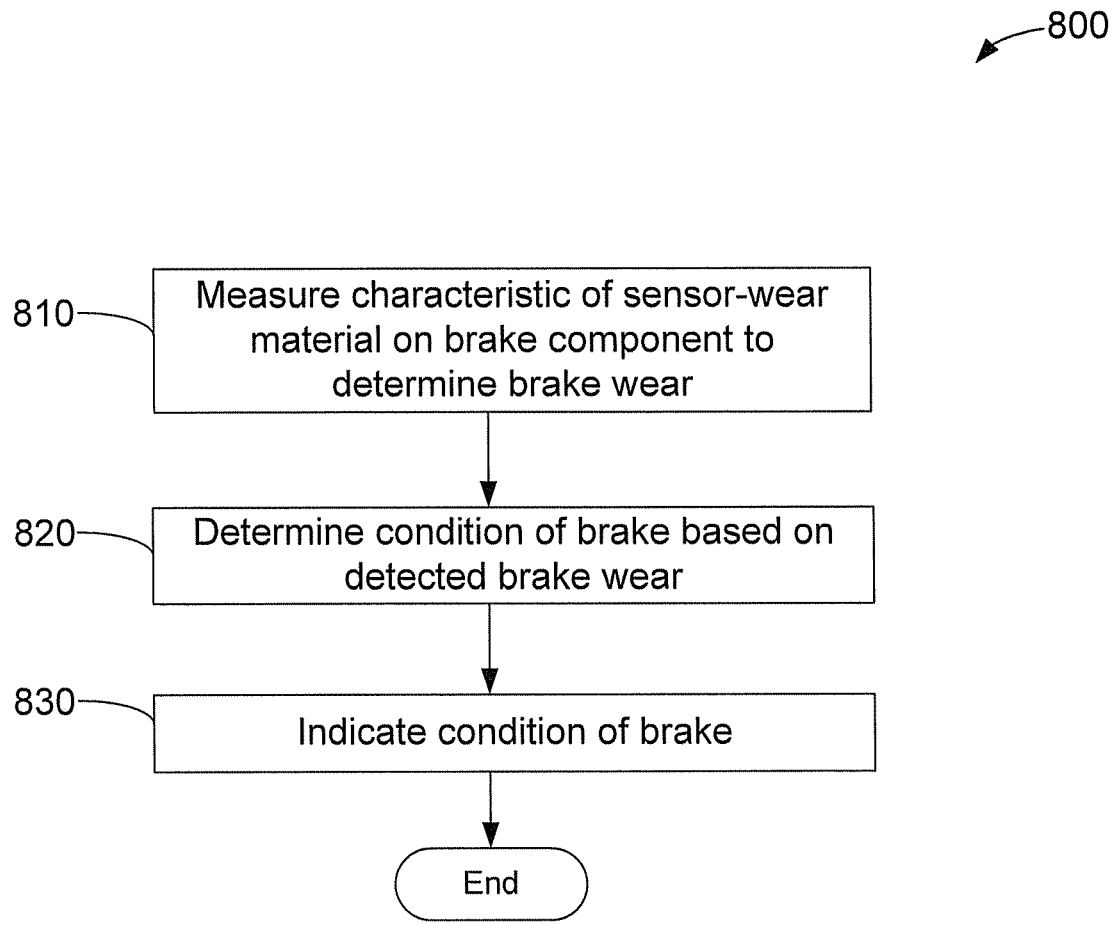
FIG. 8 is a flowchart depicting an example method in accordance with embodiments of the invention.

The machine-language instructions 522 and the data structures 524 contained in the data storage 520 include instructions executable by the processing unit 510 and any storage required, respectively, to perform some or all of the procedures of herein-described method 800 of FIG. 8, and/or perform some of all of the herein-described functionality of an electronics assembly and/or a brake-wear calculator.

The machine-language instructions 522 also may include instructions executable by the processing unit 510 to perform part or all of the functionality of an MS-alert apparatus.

The user interface 530 may comprise an input unit 532 and/or an output unit 534. The input unit 532 may receive user input from a user of the computing device 500. The input unit 532 may comprise a keyboard, a keypad, a touch screen, a computer mouse, a track ball, a joystick, and/or other similar devices, now known or later developed, capable of receiving user input from a user of the computing device 500.

The output unit 534 may provide output to a user of the computing device 300. The output unit 534 may comprise a visible output device, such as one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information to a user of computing device 500. The output unit 534 may alternately or additionally comprise one or more aural output devices, such as a speaker, speaker jack, audio output port, audio output device, earphones, and/or other similar devices, now known or later developed, capable of conveying sound and/or audible information to a user of computing device 500. In particular, the output unit may comprise a brake-wear indicator and/or an MS-health indicator.

The network-communication interface 540 is configured to send and receive data and may include a wired-communication interface and/or a wireless-communication interface. The wired-communication interface, if present, may comprise a wire, cable, fiber-optic link or similar physical connection to a wide area network (WAN), a local area network (LAN), one or more public data networks, such as the Internet, one or more private data networks, or any combination of such networks. The wireless-communication interface, if present, may utilize an air interface, such as an IEEE 802.15.4 (Zigbee), IEEE 802.11 (e.g., Wi-Fi) and/or IEEE 802.16 (e.g., WiMax) interface to one or more sensors, a WAN, a LAN, one or more public data networks (e.g., the Internet), one or more private data networks, or any combination of public and private data networks.

The sensor interface 550 may be configured to measure sensor-wear material. The sensor interface 550 may comprise a wire, cable, fiber-optic link or similar physical connection to the sensor-wear material. The sensor interface 550 may comprise one or more measuring devices 552, described with reference to FIGS. 3A and 3B above, to measure one or more characteristics of sensor-wear material.

The power unit 560 may be configured to provide electrical power to the computing device 500. The power unit 560 may comprise circuitry to utilize either alternating current or direct current. For example, the power unit 560 may comprise a connection to draw input power from an external power source and a power supply configured to convert input power for use by the computing device 560. Example external power sources are an electrical grid, electrical generator, and/or one or more electrical batteries, such as a vehicle battery.

The power unit 560 may comprise one or more electrical batteries. The batteries may utilize one or more storage technologies to store electrical energy, such as, but not limited to carbon-zinc, lead-acid, alkaline (zinc-manganese oxide), and/or lithium-ion technologies.

The power unit 560 may comprise an energy harvester. The energy harvester may include a piezoelectric device. A piezoelectric device is a device that may generate electrical power based on mechanical stress, such as vibrations of a vehicle engine and/or wheel. The energy harvester may comprise a device that generates electrical power from heat energy and/or kinetic energy as well. The energy harvester may comprise one or more solar cells to generate electrical power from energy radiated from the sun.

Example Brake-Wear Indicators

Figure 6A:
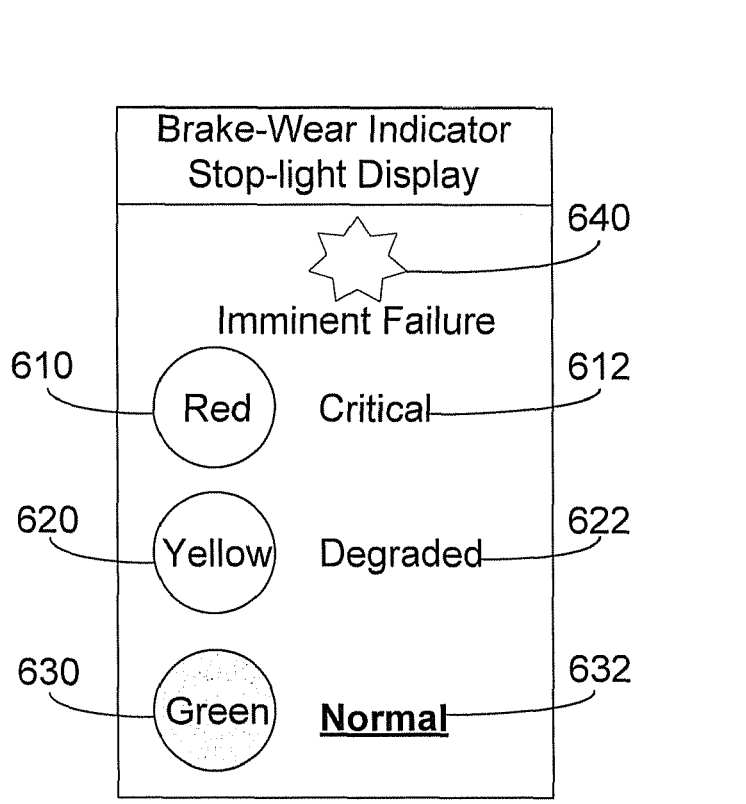
FIG. 6A shows an example brake-wear indicator with a stop-light display in accordance with embodiments of the invention.

FIG. 6A shows an example brake-wear indicator 600 with a stop-light display, in accordance with embodiments of the invention. The brake-wear indicator 600 may be (part of) the output unit 534 described above with respect to FIG. 5.

A brake-wear value may be determined based on one or more measurements of sensor-wear material. An example process that may be used to determine the brake-wear value is:

(i) Relate the measurements of sensor-wear material to brake-wear values. Testing or other empirical studies of brakes under various wear conditions may determine a measurement-brake-wear relationship between sensor-wear material and brake wear. The testing or empirical studies may measure characteristics of sensor-wear material, such as one or more of the characteristics described above with respect to FIGS. 3A and 3B, at various wear conditions of the tested brakes (e.g., when the tested brakes are new and have no wear, when the tested brakes are 50% worn, when the tested brakes are completely worn, etc.).

The measurement-brake-wear relationship may also provide an estimated-mileage value as well. The estimated-mileage value may be determined by the same testing or empirical studies of brakes under various wear conditions used to determine the brake-wear values. The estimated-mileage value may indicate a number of miles before a brake component (e.g., a disc-brake pad of a disc brake or a drum-brake shoe) is to be replaced.

The determined measurement-brake-wear relationship may be a well-known mathematical relationship (e.g., measurements of electrical resistance and brake wear for a given type of brakes and/or sensor-wear material may have a linear, quadratic, or exponential relationship). The determined measurement-brake-wear relationship may be, also or in addition, a table of measurement values and related brake-wear values. An example table of measurement values and related brake-wear values (indicated as a percentage of brake wear) and estimated-mileage values is shown below as Table 1.

TABLE 1

| Measurement Value | Brake-Wear Value | Estimated Mileage |
| --- | --- | --- |
| 1 | 90% | 0 |
| 2 | 80% | 1000 |
| 3 | 60% | 5000 |
| 4 | 30% | 15000 |
| 5 | 15% | 40000 |

While Table 1 shows measurement values, brake-wear values, and estimated-mileage values in one table, it is to be understood that the brake-wear values may be stored and the estimated-mileage values may be stored in separate tables (or similar data structures) as well. It is also to be understood that the brake-wear values may indicate a brake-life value instead or as well. The brake-life percentage may be the opposite of the brake-wear value, e.g. 100% minus the brake wear value. Further, it is to be understood that a brake-wear value and/or a brake-life value may be expressed as a number other than as a percentage, instead or as well.

Then, the measurement-brake-wear relationship may be indicated by presenting a measurement value to a lookup table (or similar data structure, such as, but not limited to, a database or hash table) storing the table of measurement values and related brake wear. Similarly, the estimated-mileage value for the presented measurement may be determined based on the presented measurement value. The related brake wear value and/or the estimated-mileage value may be refined by use of interpolation, such as linear or quadratic interpolation, of the lookup table entries as well.

If more than one characteristic of sensor-wear material is measured at one time, the measurement-brake-wear relationship may have information about each measurement that may be made. For example, suppose both temperature and electrical resistance of sensor-wear material are measured for a given brake. The measurement-brake-wear relationship may have entries for both the temperature and the electrical resistance of the brake, as well as corresponding brake-wear values and/or estimate-mileage values.

Information about the measurement-brake-wear relationship may be stored in one or more data structures 524 stored in the data storage 520 of a computing device 500, perhaps acting as an electronics assembly or a brake-wear calculator.

(ii) Perform a measurement of the sensor-wear material for the brake of interest.

(iii) Using the measurement-brake-wear relationship determined above, determine the brake-wear value based on the measurement of the sensor-wear material for the brake of interest.

A brake-wear state may be determined by comparing a brake-wear value with one or more brake-wear thresholds. The brake-wear thresholds may be stored in a brake-wear-threshold-table. The brake-wear-threshold-table may be stored in one or more data structures 524 in the data storage 520 by a computing device 500, perhaps acting as an electronics assembly or a brake-wear calculator.

The brake-wear thresholds may be determined by presenting the brake-wear value to a brake-wear-threshold-table data structure, which may store a value of brake-wear thresholds.

Table 2A below is an example table of brake-wear thresholds:

TABLE 2A

| Threshold | Value |
|---|---|
| Degraded Threshold | 90% |
| Normal Threshold | 60% |

In this example, the brake-wear state corresponds to: (i) a critical brake-wear state if the brake-wear value is greater than the degraded threshold, (ii) a degraded brake-wear state if the brake-wear value is greater than the normal threshold and less than or equal to the degraded threshold, or (iii) a normal brake-wear state if the brake-wear value is less than or equal to the normal threshold.

For example, using the values of Table 2A, the brake-wear state is determined to be critical if the brake-wear value is greater than the degraded threshold of 90%. If the brake-wear value is greater than the normal threshold of 60% and less than or equal to the degraded threshold of 90%, the brake-wear state is determined to be degraded. Also, if the brake-wear value is less than or equal to the normal threshold of 60%, the brake-wear state is determined to be normal.

An imminent-failure brake wear state may be determined as well. The imminent-failure brake wear state may be determined by use of an additional threshold added to the table of brake wear thresholds, such as shown in example Table 2B below.

TABLE 2B

| Threshold | Value |
|---|---|
| Critical Threshold | 95% |
| Degraded Threshold | 90% |
| Normal Threshold | 60% |

In the example of Table 2B, the brake-wear state may be an imminent-failure brake-wear state if the brake-wear value is greater than the critical threshold of 95% and the brake-wear state may be a critical brake-wear state if the brake-wear value is greater than the degraded threshold of 90% but less than the critical threshold of 95%. The brake-wear state may be determined to be in a degraded brake-wear state or a normal brake-wear state in the example of Table 2B in the same fashion as discussed above for the example of Table 2A.

The brake-wear state may be determined to be an imminent-failure brake-wear state based on other measurements as well. For example, the brake-wear state may be an imminent-failure brake-wear state if a temperature of the brake is determined to exceed an imminent-failure-temperature threshold. The brake-wear state may be determined to be an imminent-failure brake-wear state based on other characteristics of the brake as well, such as detecting a mechanical condition of the brake that causes the brakes to fail, e.g., "hanging" or "locking" brakes.

The brake-wear value and/or the brake-wear state may be sent from an electronics assembly and/or a brake-wear calculator to an external computing device 270. The electronics assembly and/or a brake-wear calculator may use the format of an MS-health record to send the brake-wear value and/or the brake-wear state.

The MS-health record is described with respect to FIG. 8 of the MS-alert Application. The substantial contents of FIG. 8 are reproduced in Table 3 below:

TABLE 3

| MS-Health Record |
|---|
| Date/time information |
| Type of measurement |
| Type of action |
| Measurement data |
| Engine-health state |
| MS identifier |
| Model ID of MS |
| Other characteristics |

Using the above MS-health record, a brake-wear value may be sent to the external computing device 270 with a type of measurement such as "Brake-Wear Value" and with measurement data including the brake-wear value. Similarly, a brake-wear state may be sent to the external computing device 270 with a type of measurement such as "Brake-Wear State" and with measurement data including the brake-wear value. Further, a brake location, such as a textual string or brake identifier, may be sent in an MS-health record, perhaps as an MS identifier (e.g., a brake identifier) and/or as "other characteristics" (e.g., a textual string indicating brake location).

The brake-wear calculator 240 and/or the external computing device 270 may generate a trend analysis diagram based on data about the vehicle 200. As described in more detail in the MS-alert Application, particularly with respect to FIG. 10 of the MS-alert Application, a trend analysis diagram shows a graph of an MS-health indicator or a MS-measurement value (e.g., brake wear) over time with respect to one or more MS-health states (e.g., critical, degraded, or normal).

The plurality of MS-health records may be made available to the external computing device 270, brake-wear calculator 240, and/or electronics assembly 314 operable as a planning tool, such as the exemplary convoy planning tool described in U.S. patent application Ser. No. 11/955,198 entitled "Vehicle Deployment Planning System," filed on Dec. 12, 2007, the complete contents of which are incorporated herein by reference. The planning tool may generate the trend analysis diagram, based, at least in part, on data stored in the plurality of MS-health records. The trend analysis diagram may be generated with custom software, general database software written by vendors such as Honeywell International, Inc. of Morristown, N.J., internal database tools, or by a plurality of software resources.

The data in the plurality of the MS-health records also may be used, perhaps by the planning tool, to schedule maintenance activities, such as scheduling the repair of a brake whose brake-wear state is indicated in one or more MS-health records to be "degraded" or "critical" or whose brake-wear value is greater than 70%.

The stop-light display may comprise graphical indicators of the brake-wear state. FIG. 6A shows brake-wear indicator 600 with three graphical indicators: a critical graphical indicator 610, a degraded graphical indicator 620, and a normal graphical indicator 630. FIG. 6A also shows the graphical indicators 610, 620, and 630 as circular in shape and arranged with the critical graphical indicator 610 above the degraded graphical indicator 620, and the degraded graphical indicator 620 above the normal graphical indicator 630.

FIG. 6A shows the brake-wear indicator 600 with three textual indicators: a critical textual indicator 612, a degraded textual indicator 622, and a normal textual indicator 632. It is to be understood that the brake-wear indicator may comprise more or fewer indicators, preferably depending on a corresponding increase or decrease of possible brake-wear states.

Figure 6B:
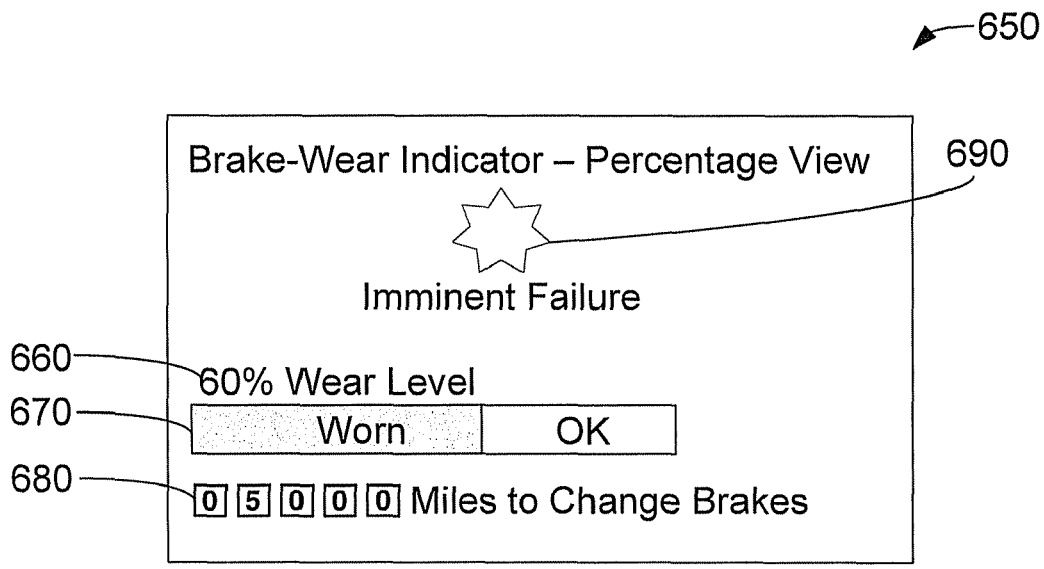
FIG. 6B shows an example brake-wear indicator with a percentage view in accordance with embodiments of the invention.

The brake-wear indicator 600 may display graphical and/or textual indicators of the brake-wear value and/or the estimated-mileage value without use of a stop-light indicator. FIG. 6B shows an example brake-wear indicator 650 displaying a percentage view of the brake-wear value using both a textual-percentage-wear indicator 660 and a graphical-percentage-wear indicator 670. As shown in FIG. 6B, both the textual-percentage-wear indicator 660 and the graphical-percentage-wear indicator 670 indicate a brake at a 60% wear level. FIG. 6B shows a brake-wear-mileage-estimate indicator 680 indicating the brake has an estimated-mileage value of 5000 miles.

A graphical and/or textual indicator may indicate a brake-wear state. Example brake-wear states include a normal brake-wear state, a degraded brake-wear state, a critical brake-wear state, and an imminent-failure brake-wear state. It is to be understood that more or fewer brake-wear states may be displayed using graphical and/or a textual indicator.

Figure 7A:
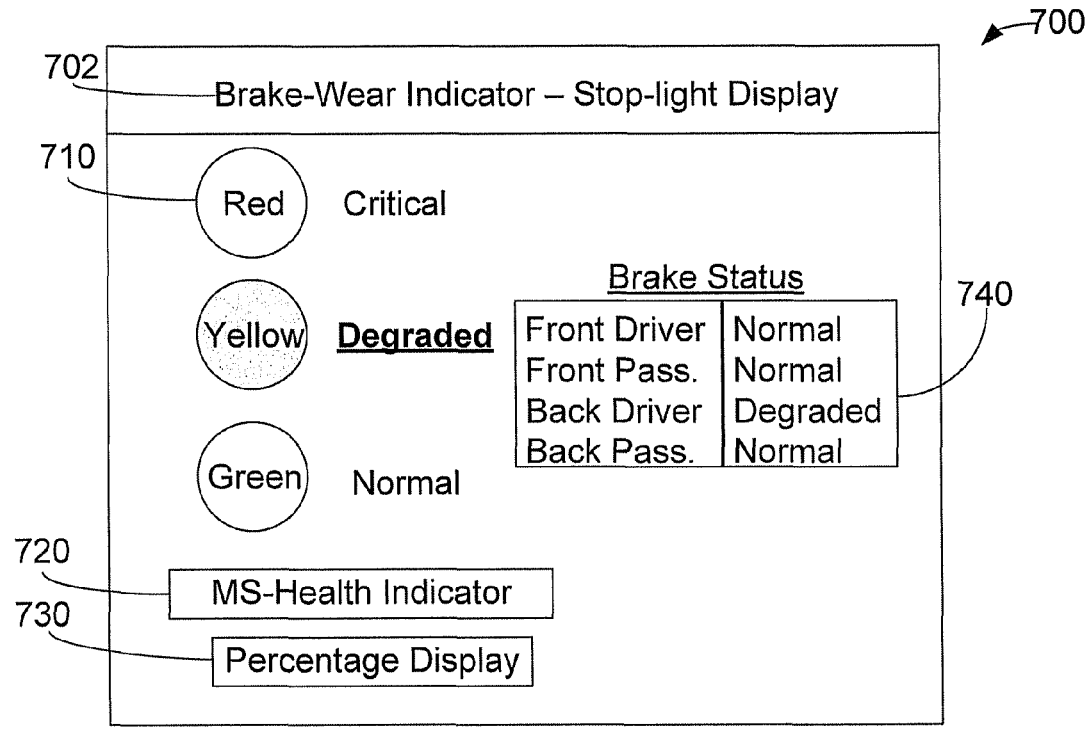
FIGS. 7A and 7B show example combined brake-wear and mechanical-system (MS)-health indicators in accordance with embodiments of the invention.
Figure 7B:
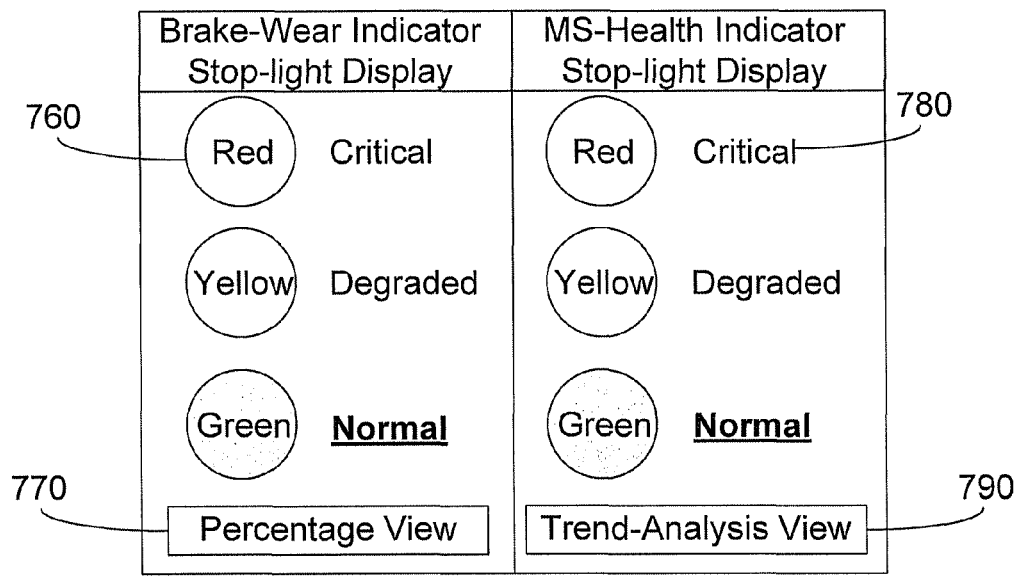

In FIGS. 6A, 7A and 7B, a brake-wear state is indicated by showing: (i) a graphical indicator as shaded and (ii) a textual indicator in a bold and underlined typeface. FIG. 6A indicates the normal brake-wear state by showing the normal graphical indicator 610 as shaded and the normal textual indicator 612 in a bold and underlined typeface. A brake-wear calculator or electronics assembly may change other aspects of a graphical indicator to indicate a brake-wear state, such as, but not limited to, the color, brightness, size, and shape of the graphical indicator. The brake-wear calculator or electronics assembly may change other aspects of a textual indicator to indicate a brake-wear state, such as, but not limited to foreground color, background color, brightness, size, position, and wording of the textual indicator. Further, a textual and/or graphical indicator may flash and/or change position on a brake-wear indicator to indicate a brake-wear state, such as a normal brake-wear state, a degraded brake-wear state, a critical brake-wear state and/or an imminent-failure brake-wear state.

For example, an imminent-failure brake-wear state may be indicated by having the critical graphical indicator 630 of FIG. 6A or the graphical-percentage-wear indicator 670 of FIG. 6B flash and/or be displayed with an imminent-failure-oriented color (e.g., red), having the critical textual indicator 632 of FIG. 6A and/or the textual-percentage-wear indicator 670 of FIG. 6B change text (e.g., to "Imminent Failure!"), typeface, and/or color, and/or display a separate imminent-failure brake-wear indicator 640 for FIG. 6A or imminent-failure brake-wear indicator 690 for FIG. 6B. Other techniques for indicating an imminent failure are possible as well.

FIG. 7A shows an example combined brake-wear indicator and MS-health indicator 700, in accordance with embodiments of the invention. The MS-health indicator is described in detail in the MS-alert Application. FIG. 7A shows the combined brake-wear indicator and MS-health indicator 700 with a stop-light display 710, an indicator button 720, a display button 730, and a brake-status table 740.

A title 702 indicates the combined brake-wear indicator and MS-health indicator 700 is acting as a brake-wear indicator and thus the stop-light display 710 acts to indicate a brake is in a degraded state. If the combined brake-wear indicator and MS-health indicator 700 were acting as an MS-health indicator instead, the title 702 may change to indicate that the combined brake-wear indicator and MS-health indicator 700 was acting as an MS-health indicator (e.g., "MS-Health Indicator—Stop-Light Display") and the stop-light display 700 may then act to indicate an MS-health state.

FIG. 7A shows the indicator button 720 with text of "MS-Health Indicator". The indicator button 720, when selected, may toggle the functionality of the combined brake-wear indicator and MS-health indicator 700 between acting as a brake-wear indicator (as shown in FIG. 7A) and acting as an MS-health indicator. The indicator button 720 may be selected with an input device, such as a mouse, or the combined brake-wear indicator. The MS-health indicator 700 may use a touch screen and, in that case, the indicator button 720 may be selected by touch.

When the combined brake-wear indicator and MS-health indicator 700 is acting as an MS-health indicator: (a) the text of the indicator button 720 may change to show the non-selected option (e.g., "Brake-Wear Indicator") and (b) upon selection of the MS-health indicator button 720, the combined brake-wear indicator and MS-health indicator 700 may then toggle to act as a brake-wear calculator.

FIG. 7A shows the display button 730. Selection of the display button 730 may cause the display shown on the combined brake-wear indicator and MS-health indicator 700 to toggle between a stop-light display (as shown in FIG. 7A) and a percentage-display. Upon selection to display a percentage display, the text of the display button 730 may change to indicate the non-selected option (e.g., "Stop-Light Display") and the combined brake-wear indicator and MS-health indicator 700 may show a percentage display.

FIG. 7A also shows a brake-status table 740, indicating the brake-wear state and locations of multiple brakes. The brake-status table 740 may indicate the brake-wear state and/or brake-wear value for some or all of the brakes of a mechanical system, such as a vehicle. The brake-status table may indicate the locations for some or all of the brakes of the mechanical system.

FIG. 7B shows another example combined brake-wear indicator and MS-health indicator 750, in accordance with embodiments of the invention. The combined brake-wear indicator and MS-health indicator 750 simultaneously displays a brake-wear indicator 760 and an MS-health indicator 780. A display button 770 performs a similar function to the display button 730 described above with respect to FIG. 7A. The MS-display button 790 toggles the display of the MS-health indicator 780 between a stop-light display as shown in FIG. 7B and a trend-analysis display. The trend-analysis display of the combined brake-wear indicator and MS-health indicator 750 may display a trend analysis diagram, described above with respect to FIG. 6. The text of the MS-display button 790 may change to indicate the non-selected option as well.

An Example Method for Indicating a Brake-Wear Level

FIG. 8 is a flowchart depicting an example method 800, in accordance with an embodiment of the invention. It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

The method 800 begins at block 810. At block 810, a characteristic of sensor-wear material on a brake component is measured. For example, the brake component may be a disc-brake pad or a brake shoe.

The brake wear of the brake may be determined based on a measurement of the characteristic of the sensor-wear material. Example characteristics of the sensor-wear material that may be measured are electrical resistance, voltage, current, capacitance, impedance, conductance, temperature, color, reflectivity, transmittance, length, thickness, and/or weight, as well as combinations of the herein-described characteristics. The sensor-wear material may be arranged on the brake component at one or more sensor-wear-detection points, using one or more sensor-wear layers, or using a combination of sensor-wear-detection points and/or sensor-wear layers.

The brake wear of the brake may be determined using a measurement-brake-wear relationship. The measurement-brake-wear relationship may relate a measurement of sensor-wear material to a brake-wear value and/or an estimated-mileage value determined based on testing of brakes at various wear conditions. The measurement-brake-wear relationship may be stored in a lookup table or similar data structure of a computing device, such as the computing device 500 described above with respect to FIG. 5.

At block 820, a condition of the brake may be determined based on the determined brake wear. The condition of the brake may include a brake-wear value, a brake-life value, a brake-wear state, an estimated-mileage value, or a combination of the brake-wear value, the brake-life value, the estimated-mileage value, and/or the brake-wear state. The brake-wear state may be determined by comparing a brake-wear value to one or more brake-wear thresholds. The one or more brake-wear thresholds may be stored in a table or similar data structure of a computing device such as the computing device 500 described above with respect to FIG. 5.

At block 830, a condition of the brake may be indicated. The condition of the brake may be indicated using a brake-wear indicator and/or on a combined brake-wear indicator and MS-health indicator. The condition of the brake may be indicated on a stop-light display and/or a percentage display. The condition of the brake may be indicated using a trend analysis diagram. The location of the brake may be indicated along with the condition of the brake may be indicated. If a device utilizing the brake also utilizes other brakes, the conditions of the other brakes of the device may be indicated as well, perhaps using a brake status table.

After executing the procedures of block 830, the method 800 ends.

CONCLUSION

While certain features and embodiments of the present invention have been described in detail herein, it is to be understood that the invention encompasses all modifications and enhancements within the scope and spirit of the following claims.

In particular, while the brakes described herein have been shown as adapted for use with motor vehicles, the invention could be used with other types of vehicles not specifically described above, such as, but not limited to, rail cars, locomotive engines, elevators, cranes, tanks, trolleys, airplanes, all-terrain vehicles, bicycles, tricycles, unicycles, and motorcycles.

Also, the invention could be used with machinery other than vehicles that are equipped with brakes, such as, but not limited to, factory equipment, mining equipment, elevators, fitness gear, and self-propelled weapons.

What is claimed is:

1. A brake, comprising:
   friction material;
   a backing pad;
   a first section of sensor-wear material embedded within the friction material;
   a second section of sensor-wear material embedded within the friction material, wherein the first section of sensor-wear material is separated from the second section of sensor-wear material by friction material; and
   an electronics assembly configured to measure a characteristic of at least one of the first section of sensor-wear material or the second section of sensor-wear material.

2. The brake of claim 1, wherein the brake is configured for use with a vehicle.

3. The brake of claim 2, wherein the brake is a disc-brake pad.

4. The brake of claim 2, wherein the brake is a drum-brake shoe.

5. The brake of claim 1, wherein the characteristic of the at least one of the first section of sensor-wear material or the second section of sensor-wear material is comprises an electrical resistance of the sensor-wear material.

6. The brake of claim 1, wherein the characteristic of the at least one of the first section of sensor-wear material or the second section of sensor-wear material comprises a temperature of the sensor-wear material.

7. The brake of claim 1, wherein the electronics assembly comprises an energy harvester.

8. The brake of claim 1, wherein the electronics assembly is configured to determine a condition of the brake.

9. The brake of claim 8, wherein the condition of the brake comprises a brake-wear value.

10. The brake of claim 8, wherein the electronics assembly is configured to transmit the condition of the brake via a network-communication interface.

11. The brake of claim 10, wherein the interface is a wireless interface.

12. A system, comprising:
a first brake configured for use in a vehicle, the first brake comprising:
  friction material,
  a backing pad,
  a first section of sensor-wear material embedded within the friction material;
  a second section of sensor-wear material embedded within the friction material wherein the first section of sensor-wear material is separated from the second section of sensor-wear material by friction material;
  an electronics assembly configured to measure a characteristic of at least one of the first section of sensor-wear material or the second section of sensor-wear material; and
a brake-wear calculator, comprising:
  a processing unit,
  a brake-wear indicator,
  data storage, and
  machine-language instructions stored in the data storage and executable by the processing unit to perform functions including:
    receiving a first measurement of the characteristic of the at least one of the first section of sensor-wear material or the second section of sensor-wear material of the first brake, and
    displaying an indication of a condition of the first brake on the brake-wear indicator, wherein the indication of the condition of the first brake is based on the first measurement.

13. The system of claim 12, wherein the machine language instructions executable to display the indication of the condition of the first brake are executable to display an indication that the condition of the first brake is critical.

14. The system of claim 12, further comprising:
a second brake adapted for use in the vehicle, the second brake comprising:
  friction material,
  a backing pad,
  a first section of sensor-wear material embedded within the friction material;
  a second section of sensor-wear material embedded within the friction material wherein the first section of sensor-wear material is separated from the second section of sensor-wear material by friction material; and
  an electronics assembly configured to measure a characteristic of at least one of the first section of sensor-wear material or the second section of sensor-wear material.

15. The system of claim 13, wherein the functions further include:
receiving a second measurement of the characteristic of the at least one of the first section of sensor-wear material or the second section of sensor-wear material of the second brake, and
displaying an indication of a condition of the second brake on the brake-wear indicator, wherein the indication of the condition of the second brake is based on the second measurement.

16. The system of claim 15, wherein the functions further include displaying a brake status comprising:
the indication of the condition of the first brake,
a location of the first brake,
the indication of the condition of the second brake, and
a location of the second brake.

17. The system of claim 14, wherein the brake-wear indicator comprises a stop-light display.

18. The system of claim 14, wherein the brake-wear indicator comprises a percentage view.

19. The system of claim 14, wherein the functions further include:
displaying a mechanical system (MS)-health indicator.

20. A method, comprising:
measuring a characteristic of at least one of a first section of sensor-wear material or a second section of sensor-wear material on a brake component to determine brake wear, wherein the first section of sensor-wear material and the second section of sensor-wear material are embedded within a friction material, and wherein the first section of sensor-wear material is separated from the second section of sensor-wear material by the friction material;
determining a condition of the brake based on the brake wear; and
indicating the condition of the brake.

* * * * *

UNITED STATES PATENT AND TRADEMARK OFFICE
CERTIFICATE OF CORRECTION

PATENT NO.        : 7,877,216 B2                                   Page 1 of 1
APPLICATION NO.   : 12/182480
DATED             : January 25, 2011
INVENTOR(S)       : Wright et al.

It is certified that error appears in the above-identified patent and that said Letters Patent is hereby corrected as shown below:

Column 14, line 56 "is" should be removed.

Signed and Sealed this
Twenty-fifth Day of October, 2011

David J. Kappos
*Director of the United States Patent and Trademark Office*